(12) United States Patent
Feehan

(10) Patent No.: US 11,435,829 B2
(45) Date of Patent: Sep. 6, 2022

(54) COMMUNICATION DEVICE AND METHOD USING HAPTIC ACTUATOR

(71) Applicant: WEFT Co., Brooklyn, NY (US)

(72) Inventor: Noah Landwehr Feehan, Brooklyn, NY (US)

(73) Assignee: WEFT CO., Brooklyn, NY (US)

( * ) Notice: Subject to any disclaimer, the term of this patent is extended or adjusted under 35 U.S.C. 154(b) by 0 days.

(21) Appl. No.: 16/839,818

(22) Filed: Apr. 3, 2020

(65) Prior Publication Data

US 2020/0233496 A1 Jul. 23, 2020

Related U.S. Application Data

(63) Continuation of application No. PCT/US2018/057562, filed on Oct. 25, 2018.

(60) Provisional application No. 62/577,639, filed on Oct. 26, 2017.

(51) Int. Cl.
 *G06F 3/01* (2006.01)
(52) U.S. Cl.
 CPC .................................. *G06F 3/016* (2013.01)
(58) Field of Classification Search
 None
 See application file for complete search history.

(56) References Cited

U.S. PATENT DOCUMENTS

| | | | |
|---|---|---|---|
| 9,564,029 B2 | 2/2017 | Morrell et al. | |
| 9,579,048 B2 | 2/2017 | Rayner et al. | |
| 9,696,806 B2 | 7/2017 | Modarres et al. | |
| 9,733,880 B2 | 8/2017 | Levesque et al. | |
| 2008/0303795 A1 | 12/2008 | Lowles et al. | |
| 2010/0231550 A1 | 9/2010 | Cruz-Hernandez et al. | |
| 2011/0074733 A1* | 3/2011 | Makinen | G09B 21/004 345/174 |
| 2011/0285667 A1 | 11/2011 | Poupyrev et al. | |
| 2012/0286944 A1 | 11/2012 | Forutanpour et al. | |
| 2013/0016042 A1 | 1/2013 | Makinen et al. | |
| 2013/0311954 A1* | 11/2013 | Minkkinen | G06F 3/04883 715/862 |
| 2014/0354570 A1 | 12/2014 | Makinen et al. | |

(Continued)

FOREIGN PATENT DOCUMENTS

| | | |
|---|---|---|
| WO | 2014130946 A2 | 8/2014 |
| WO | 2016099462 A1 | 6/2016 |

OTHER PUBLICATIONS

International Search Report issued by the International Searching Authority for corresponding International Patent Application No. PCT/US2018/57562, dated Feb. 14, 2019.

(Continued)

*Primary Examiner* — Brian M Butcher
(74) *Attorney, Agent, or Firm* — Myers Wolin, LLC

(57) ABSTRACT

A device and method are provided to provide haptic signals when a user touches the device. In one embodiment, the haptic signal provided represents a summary of messages or notifications accumulated since the user last touched the device. In another embodiment, the haptic signal corresponds to the presence or absence of specific messages or persons attempting to contact the user. In another embodiment, the haptic signal corresponds to arbitrary input from a remote user. In another embodiment, the haptic signal corresponds to a user-authored mapping between a data source and the haptic signal.

16 Claims, 8 Drawing Sheets

(56) References Cited

U.S. PATENT DOCUMENTS

| 2015/0054773 A1* | 2/2015 | Jiang ..................... G06F 3/016 |
| | | 345/174 |
| 2015/0205357 A1* | 7/2015 | Virtanen ................ G06F 3/016 |
| | | 340/407.2 |
| 2015/0293592 A1 | 10/2015 | Cheong et al. |
| 2016/0364961 A1 | 12/2016 | Cruz-Hernandez et al. |

OTHER PUBLICATIONS

Written Opinion of the International Searching Authority issued for corresponding International Patent Application No. PCT/US2018/57562, dated Feb. 14, 2019.

* cited by examiner

COMMUNICATION DEVICE AND METHOD USING HAPTIC ACTUATOR

CROSS-REFERENCE TO RELATED APPLICATIONS

This application is a continuation of International Application No. PCT/US2018/57562, filed Oct. 25, 2018 which claims the benefit of provisional application US 62/577,639, filed Oct. 26, 2017, the entire contents of which are incorporated herein by reference.

FIELD OF THE INVENTION

The invention relates to a communication system and methods for communicating messages to a user using a haptic actuator.

BACKGROUND

A mobile phone, or other mobile electronic device, has become a central part of a user's situational awareness: it functions as the gateway between the user's immediate physical experiences and his or her digital/online interactions, e.g. using social media services, sending images or text to specific people via email, SMS, and other messaging applications, and keeping track of calendar events, appointments, and schedules. As a result, mobile phone users frequently "check their phone" for notifications, events, communications, etc. that they may have missed when not using the device (for example during a conversation, while driving, or when engaged in other activities).

At present, the mobile phone and associated peripheral "wearable" devices use sound, light, and vibratory motion to synchronously alert the user to new, interesting, or special events and messages. Because they are "push" relationships (a signal is sent synchronously to the device upon the arrival of the notification, event, etc.), these signals are presented to users by way of a visual, auditory, or vibratory cue, and are often distracting to the user and nearby observers.

While existing products may include the use of electrovibration, which may be more discreet than traditional vibration, such use is limited. For example, electrovibration may be used in touch screens as haptic feedback to confirm an input. Accordingly, embodiments focus on synchronous activity, such as the immediate feedback received upon pressing a virtual button element on a mobile phone touch screen, or feedback accompanying a user action like dragging an icon across a screen.

Other uses of haptic feedback in mobile phones, or for transmitting information about notifications, are typically transmitted synchronously and non-discreetly. For example, a haptic element may transmit a pattern of motor vibrations to indicate an incoming phone call. Because the signals are synchronous, in order to immediately alert the user to a phone call or other message, the user is interrupted and distracted by the signal. Accordingly, users are often distracted by the buzzing, blinking, or audible alerts, of mobile devices.

While peripherals exist which aim to make such a vibratory alert more discreet, such as vibrating lapel pins, such peripherals still mechanically vibrate and still provide notifications synchronously.

If a user misses a traditional synchronously provided notification alert, there is often no way for the device to repeat the signal without user intervention, further increasing the importance of the user processing and reacting to the notification synchronously. The necessity on the part of the user to pay attention to, and potentially decode, a notification event adds to the user's "cognitive load" by threatening at any moment to interrupt the user with a signal for decoding and responding to.

Further, in modern smartphones, any messages missed are visually presented to a user on a screen, such that a user must look at their phone to determine what messages were missed.

Accordingly, there is a need for a discreet transmission of messages to a user in an asynchronous manner such that the user can evaluate any incoming messages without drawing attention to themselves, and such that the messages can be checked at any time after such messages are received.

SUMMARY

A device is provided for outputting haptic signals, the device comprising processing circuitry for selecting a message to be output, a signal buffer for storing a message to be output, touch-detection circuitry, and a haptic signal generator comprising a ground electrode and an actuated area. In use, the signal buffer stores messages selected for output by the processing circuitry, and outputs a stored signal to the actuated area as a haptic signal when the touch detection circuitry identifies contact with the ground electrode. The actuated area is independent of the ground electrode, such that the touch-detection circuitry does not detect contact with the actuated area. The message takes the form of a haptic signal that is output to the entirety of the actuated area, such that the same signal is retrieved regardless of what location on the actuated area is contacted by the user.

A communication module may be provided in the form of a wireless interface for linking the device to a mobile communications device, such as a smartphone. The communications module may then receive notifications from the smartphone and select messages to be output to a user based on some parameters of the notifications, or alerts, received.

The message to be output is typically a pattern to be output as a haptic signal, and it may be one of several potential messages selected based on the content of an incoming alert. The message to be output may have a parameter that can be adjusted based on a parameter of the source message received at the processing circuitry. For example, the message to be output may be selected to inform a user that a phone call was received and missed, and the parameter may be varied based on who the phone call was from or the number of phone calls missed.

In some embodiments, a plurality of messages may be selected for output in sequence, and may therefore be queued in the signal buffer.

In some embodiments, a parameter of the signal to be output may be varied over time and may depend on the time at which the touch detection circuitry identifies contact with the ground electrode. For example, the message may represent time remaining on a time, or time remaining in some predefined time period, and the parameter may vary based on defined criterion. Similarly, the signal may represent some parameter of a timeseries of data, and the signal parameter may therefore vary based on the monitored parameter of the timeseries.

Typically, the signal is an electrovibratory signal, and the actuated area remains stationary while outputting the haptic signal. The signal is retrieved by a user by rubbing the actuated area, and the signal takes the form of a detected shear friction. Accordingly, the monitored physical signal may be an electrical difference between a charge on the actuated area and a charge on the ground electrode, and the ground electrode may be used to remove charge imparted by the signal electrode from the system.

The device may have two ground electrodes, such that the touch-detection circuitry outputs the haptic signal only when contact with both ground electrodes is detected.

The device may be, for example, a housing or a case for a mobile device, and the ground electrode may be located on a side surface or back surface of the housing or case, and the actuated area may be located on the back surface of the housing.

In some embodiments, the actuated area does not have an associated visual display. In some alternative embodiments, such as when the device is integrated into a mobile device, a visual display is provided, but is independent of the actuated area.

A method may be further provided for outputting haptic messages to a user, the method comprising selecting, at processing circuitry, a message to be output to the user, storing the message in a signal buffer, detecting contact at a ground electrode of a haptic signal generator, and outputting the message to an actuated area of the haptic signal generator upon detecting contact. The same haptic signal is output to the entirety of the actuated area.

The message may be a pattern output as a haptic signal in the form of an electrical difference between a voltage at the ground electrode and a voltage at the actuated area.

DETAILED DESCRIPTION OF THE PREFERRED EMBODIMENTS

Figure 1:
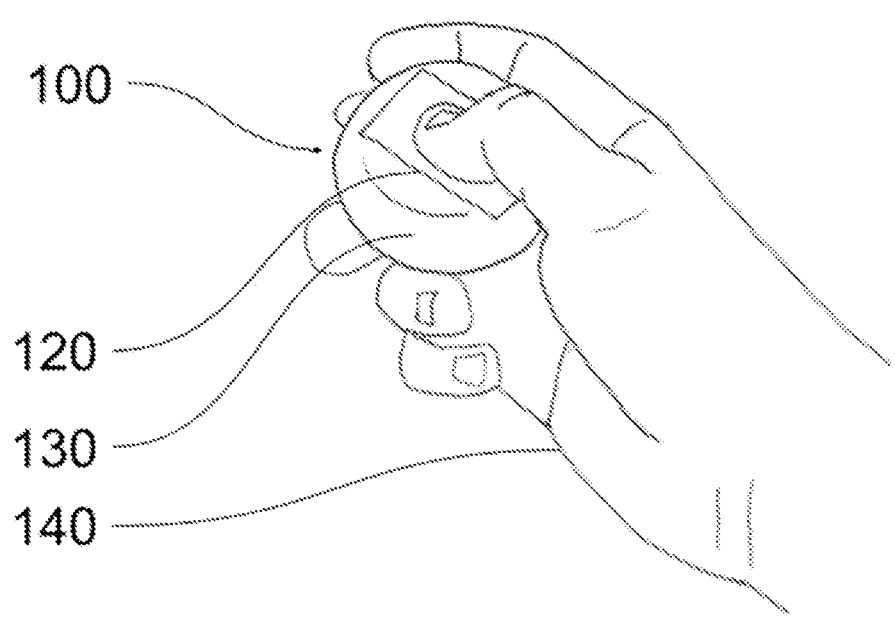
FIG. 1 shows an embodiment of a communication device of the present disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

A device and method are described for encoding information from a mobile phone or other device for on-demand access by a user at a later time. Additionally, a method for accumulating information and mapping it to a pattern of textures, relayed through a haptic actuator is described. The device presents the user with a pattern or sequence of haptic textures determined by a user-authored mapping between an event, such as an unread message from a specific person, and a specific signal, for example a 30 Hz sine wave. The device described can use both pre-set and user-authored signals (manifested in electrovibration as "textures" or "texture patterns") to indicate any number of notifications, combinations of notifications, etc. The system relays the signal only when the user is touching the device, as detected by onboard sensing (capacitive touch detection, optical interrupt, thermal difference, etc). In this way, the user is not interrupted or distracted by synchronous, observable means, e.g. blinking, beeping, or vibratory buzzing.

The present device employs a method of "accumulating" desired notifications, presenting them or a summary of them to the user when the user requests. The user determines when she or he checks the device, unlike existing products that interrupt as soon as an update has been received. Some embodiments may include a "dismissal" signal communicated to the processor after a user has finished touching the device. This signal may be used to reset the state of the device, or influence the texture-generation algorithm, for example, to mark certain alerts as "read" or "dismissed."

Additionally, the user is able to interact with the device in a manner more concealable than previous products: vibration, sound, and light, as used in past products, are all detectable by a conversational partner or passer-by. Socially, it is often desirable that a user be able to check the status of their awaiting notifications without such a check being apparent to passers-by; the device described affords this. For example, the device can be placed in a pocket or bag, concealing from others the fact that the device is being touched, and that haptic signals are being perceived by the user.

FIGS. 1-4 shows embodiments of a communication device 100 of the present disclosure. As shown, the device 100 comprises a haptic signal generator including one or more ground electrodes 110, typically a pair of ground electrodes, and an actuated area 120, with the various components mounted on a housing 130. It will be understood that the device 100 may function with only one ground electrode 110, but a simple grasp of the device may easily cover two such electrodes. Further, because a user may be handling the device 100 constantly, detecting contact with two ground electrodes 110 may allow the device to easily detect when a user grasps the device in the manner shown and thereby avoid false positives and transmit a signal when a user is simply handling the device. In some embodiments, two or more ground electrodes 110 are provided, but signals are transmitted any time contact with either such electrode is detected, so as to allow for multiple grips.

Figure 2:
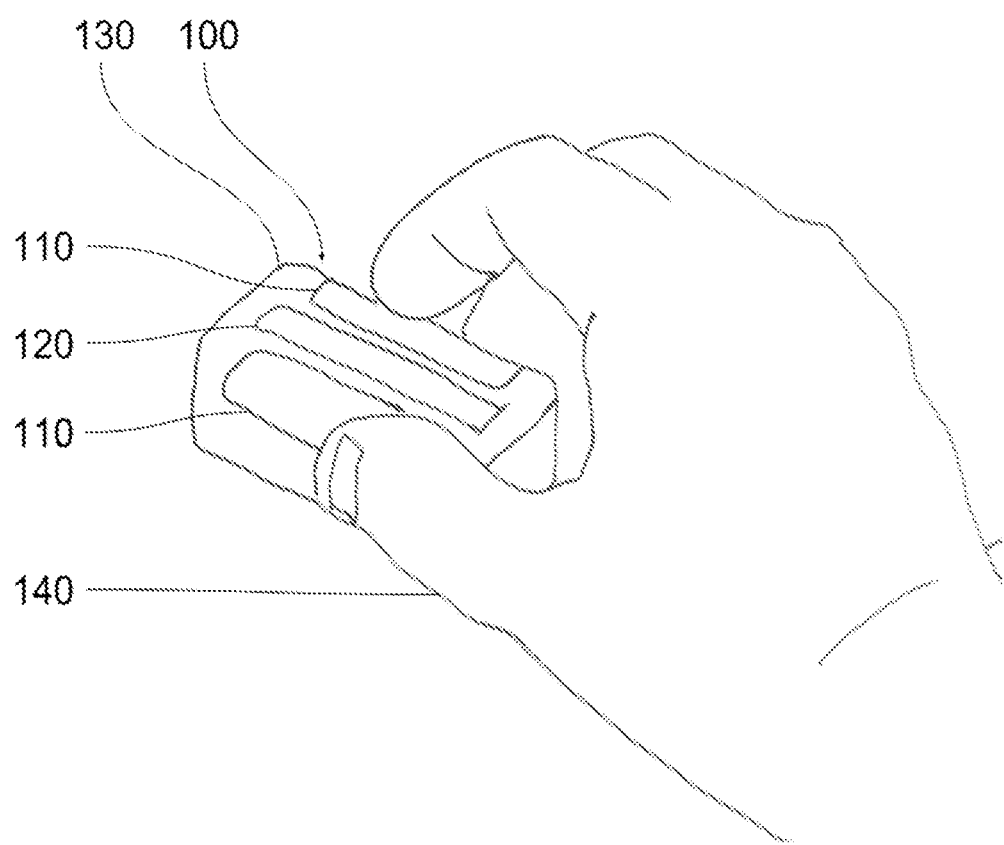
FIGS. 2 and 3 show a second embodiment of the communication device of the present disclosure in use.
Figure 3:
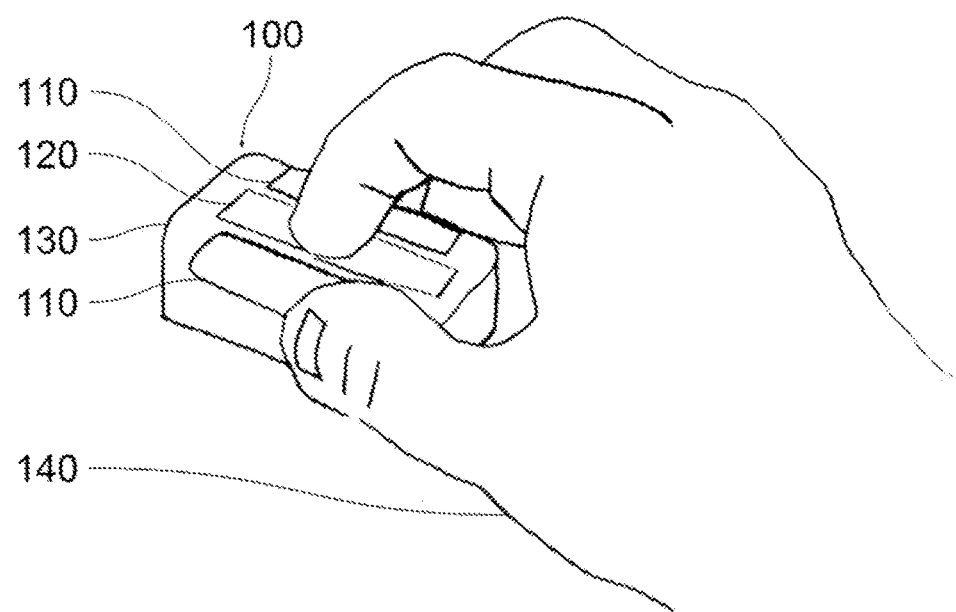

FIGS. 2 and 3 show an embodiment of the communication device 100 of the present disclosure in use. Although FIGS. 1-4 show different embodiments, all contain the same basic elements and similar elements will be referred to in all embodiments using the same reference numerals. Accordingly, FIG. 2A shows a user 140 grasping the ground electrode 110 and holding a finger above the actuated area 120 of the embodiment shown. FIG. 3, as well as FIG. 1, show a user touching the actuated area of the communication device 100.

The housings for implementations of the device 100 are designed such that when a user grasps the housing 130 of the device in a comfortable position, they contact the ground electrodes 110 and have easy access to the actuated area 120 with a finger. Further, as discussed below, in the device 100 shown, messages are typically retrieved from the actuated area 120 by rubbing or stroking the panel. Haptic signals in the form of electrovibration are detected by users as a sensation of variable shear friction on the surface, and such signals are enhanced by rubbing a finger back and forth. Accordingly, the haptic signals may be retrieved while the actuated area remains stationary, as the output is not based on a mechanical vibration.

Accordingly, the device 100 implementations are configured such that device can be grasped while rubbing the finger contacting the actuated area 120 against the device. FIG. 1 shows a grasp designed for contacting the actuated area 120 with a thumb and FIG. 3 shows a grasp designed for contacting the actuated area 120 with a pointer finger.

Figure 4:
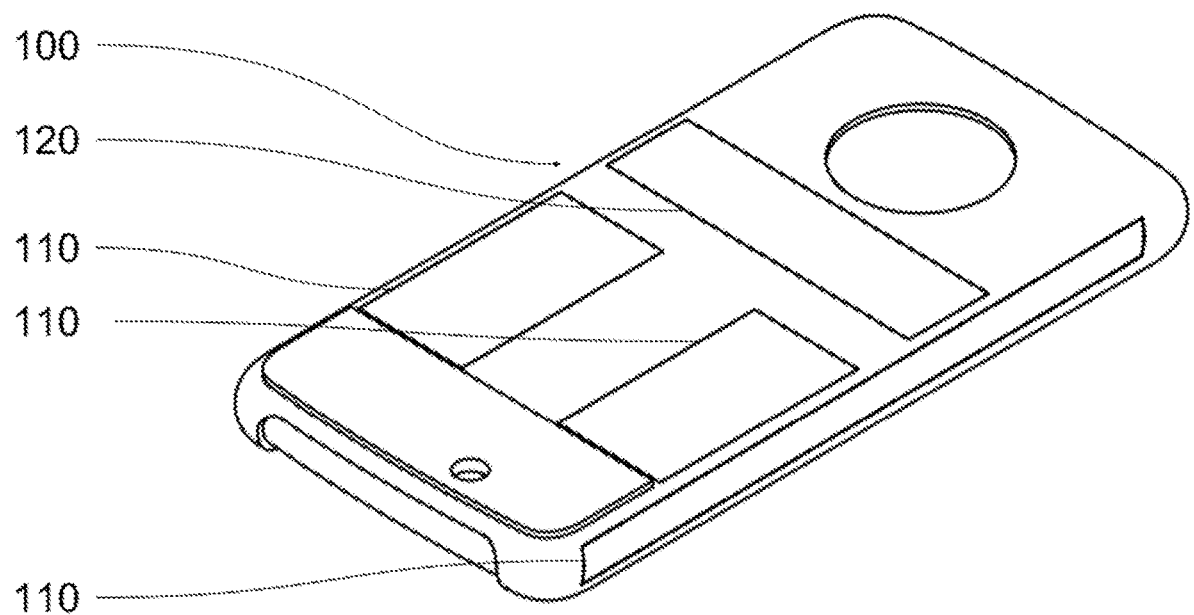
FIG. 4 shows a third embodiment of the communication device of the present disclosure integrated into a smartphone case.

FIG. 4 shows an embodiment of the communication device 100 of the present disclosure integrated into a case for a smartphone. Accordingly, the ground electrodes 110 may be contacted by a user while touching the actuated area 120. In this way, a message may be retrieved by a user from the actuated area in a manner similar to that shown in FIG. 3.

In the embodiment shown, two ground electrodes 110 are provided and positioned so that when a user is in contact with one or both electrodes, the user can contact the actuated area 120. In addition, ground electrodes 110 are be provided on sides of the case, such that they are contacted when a user holds a phone while viewing the screen. In this way, the device 100 can be configured to comfortably adapt to multiple holds and provide information as convenient to a user.

Many embodiments of the device are small, battery-powered, and contain some sort of interface for receiving a message for transmission to a user. Accordingly, it may be wirelessly linked to a user's mobile device, computer, wearable device, or other communications equipment, and it may take a variety of forms, such as panels on a worn accessory, such as glasses or bracelets, or panels on clothing, such as inside a user's pocket. Alternatively, it may be directly implemented into a smartphone or mobile device, such that the processing circuitry discussed is a processor built into the phone. Further, the device 100 may be a standalone device providing a single or small set of functions, or providing a simple user interface to select from a set of functions. Further, it may be a standalone device programmable by a separate device. In such a way, it may be programmed to function, for example, as a speaking timer or any of several other individual functionalities discussed below. In alternative embodiments, the device 100 may be integrated into a larger system as a user interface, or as a portion of a user interface, and may be powered by a main power line rather than a battery.

Figure 5:
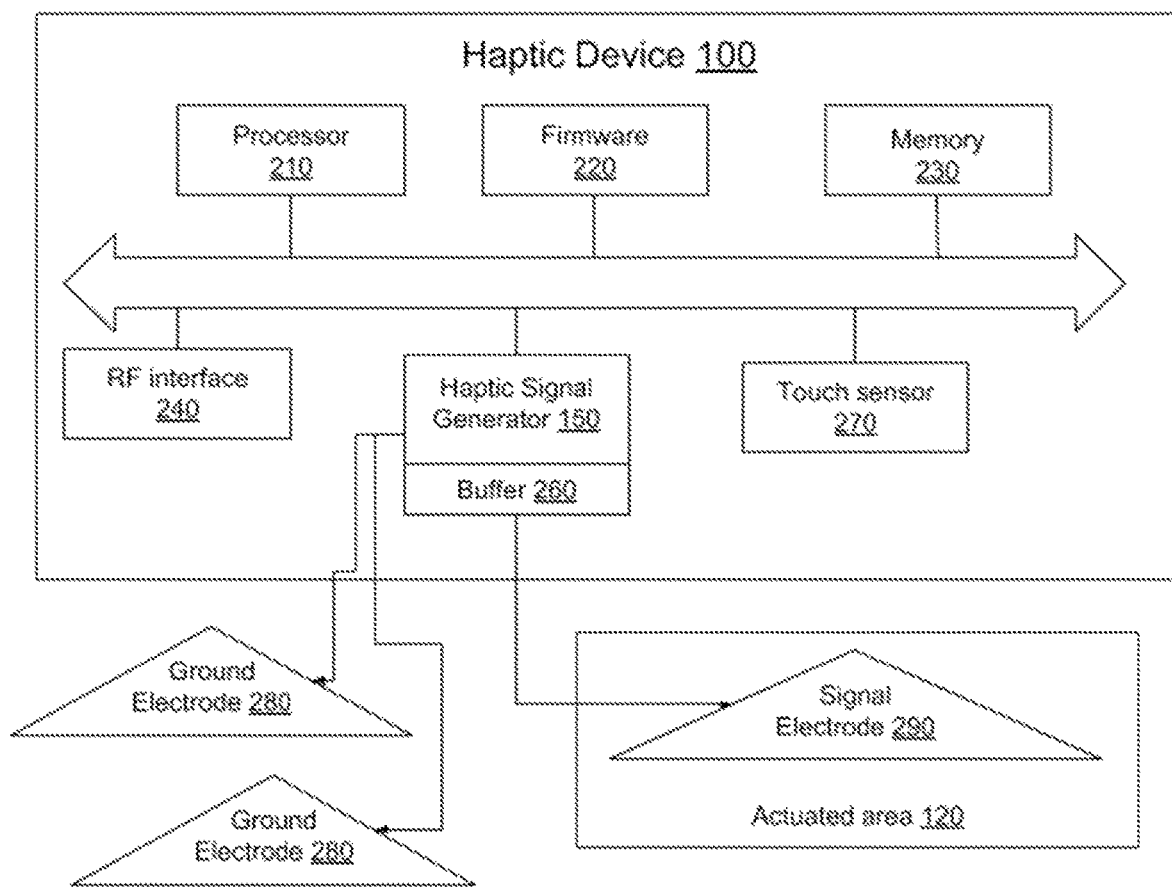
FIG. 5 shows a schematic diagram of the communication device of FIG. 1.

FIG. 5 shows a schematic diagram of the communication device 100 of FIG. 1. As shown, such a device 100 includes processing circuitry 210 for selecting a message to be output to a user, a signal buffer 260 for storing messages to be output, touch detection circuitry 270, and a haptic signal generator 150. The haptic signal generator comprises two ground electrodes 280 and a signal electrode 290, with the signal electrode interfacing with the actuated area 120. The device 100 is further provided with memory 230 for storing instructions for the processor to follow and for storing templates and formats for the various messages that can be selected and output by the processor and firmware 220 for controlling the behavior of the device.

In a typical implementation, the processing circuitry 210 selects a message from the memory 230 to be output to a user and stores it in the signal buffer 260. Upon detection of contact with the ground electrodes 280 by the touch sensor 270, the haptic signal generator 250 outputs the message from the buffer 260 to the actuated area 120 by way of the signal electrode 290. While the discussion assumes that the touch sensor 270 detects contact directly with the ground electrodes, it will be understood that the sensor may be separate and may instead monitor contact elsewhere on the device. It will be further understood that the device may include a physical switch instead of a touch sensor, or in alternative embodiments, the device may output a signal constantly. However, the device 100 may further comprise a battery, and a touch sensor 270 allows the device to conserve battery power by outputting a signal only when contact is detected. As shown, the actuated area 120 is independent of the ground electrodes 280, such that the touch sensor 270 does not detect contact with the actuated area 120.

In some embodiments, the haptic device 100 further comprises a communications module, such as an RF interface 240, for receiving alerts for transmission to a user. The RF interface 240 may be, for example, a wireless interface for linking the device to a mobile communication device, such as a smartphone. Accordingly, when the smartphone identifies an alert to be transmitted to a user, such as in the event of a received message or phone call, instead of, or in addition to, outputting it in the traditional manner, such as by synchronously ringing or vibrating, it will inform the haptic device 100 of the event by way of the RF interface 240 of the haptic device 100. The processing circuitry 210 will then select a message from the memory 230 to be output that represents the receipt of the phone call and places that message in the buffer 260 of the haptic signal generator 150.

In such an embodiment, the message is therefore not transmitted to the user until the user grasps the ground electrode 280 and places his finger on the actuated area in order to retrieve the message 290.

The memory 230 of the device, in addition to storing messages and message templates, may also store textures, texture patterns, and programmed behaviors, which can be used to assign texture patterns to particular messages or message types. The memory 230 may therefore include instructions for implementing any number of methods, such as those discussed below in reference to FIGS. 6, 8, and 9.

In the embodiments shown, messages are relayed to users of the device 100 in the form of electrovibration. Accordingly, while referred to as haptic feedback, the actuated area 120 does not move during the relaying of messages. Instead, an electrical signal is applied to the surface, and that surface can be detected by a user. Further, the same haptic signal is output to the entirety of the actuated area 120, such that a user can retrieve the signal by rubbing any location within the actuated area.

While device 100 is described as having an RF interface, alternative communication interfaces are contemplated as well, including wired interfaces or devices 100 integrated into other products.

Figure 6:
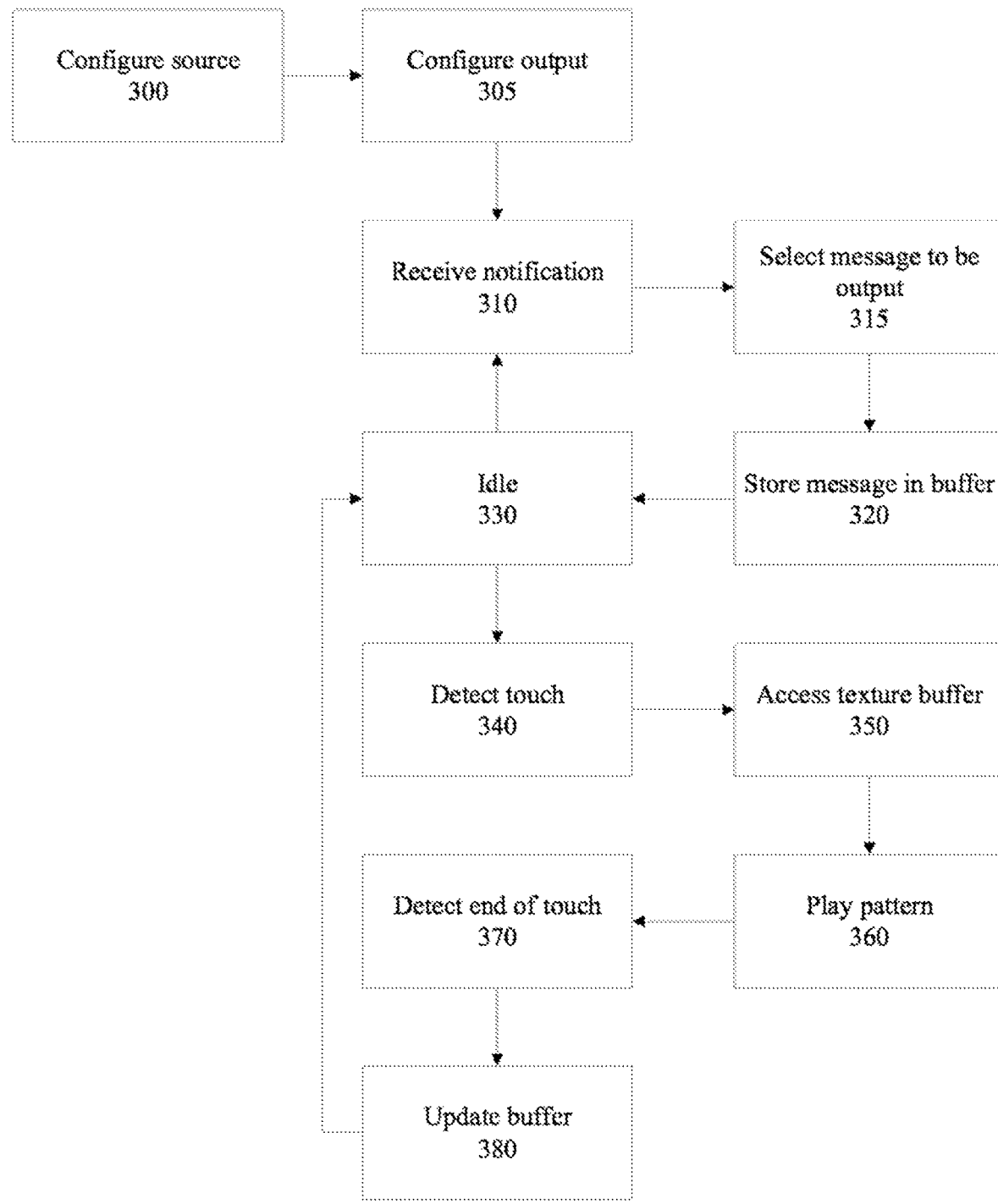
FIG. 6 shows a method for detecting and confirming a touch event using the device of FIG. 1.

FIG. 6 is a flowchart for a method for selecting and outputting haptic messages to a user using the device of FIG. 1.

In many embodiments of the device 100, the device is associated with applications on a user's mobile device, such as a smartphone, that issues notifications, i.e., event based communications from the application to the user. The user can then select a type of notification or implements a filter to further limit the notifications, and assigns a texture to the type of notification. Many rubrics can be used to define a type of notification, including application of origin, level of severity, association with a specific person, time since notification was created, or any combination thereof.

Prior to first receiving notifications, a device 100 may require configuration. Accordingly, a source of messages, such as a user's smartphone, may be configured (300) to communicate with the device 100. In such an embodiment, the output of the device may be configured (305) to define what messages are to be transmitted to the user by way of the device 100. This configuration may be by way of a graphical user interface, such as that discussed below with respect to FIG. 7.

As shown, the device 100 receives one or more notifications (310) typically by way of the RF interface 240. Such notifications are occasionally referred to herein as source messages, since they define the message from the source device, such as the user's smartphone, which is to be relayed to the user by way of the haptic device 100. Once such a notification is received, the processing circuitry 210 selects (315) a message from the memory 230 to be output to the user and stores (320) the message in the buffer 260.

Once the message is placed in the buffer 260, the device 100 remains idle (330) until further action is required. Accordingly, the device may continue to receive notifications (at 310) and if it does, it continues to select messages (at 315) and store them in the buffer (at 320). In such scenarios, multiple messages may be stored in the buffer 260 for output. Such messages may be output consecutively, for example.

In some embodiments, instead of adding such messages, the processing circuitry 210 may instead modify a parameter of the message to indicate multiple messages. Accordingly, the buffer 260 may store a first message after the device 100 receives a first notification (at 310) and may replace the message or transform the message to a second message upon receipt of a second notification. For example, if a user misses a first call, the message to be output may be a message with a first value for a parameter (i.e., rate of speed of a pattern or scale of a pattern) and when a second message is received, the pattern may be modified by increasing the speed or scale of the pattern. This may demonstrate further urgency associated with multiple missed messages.

While the device 100 sits idle with messages stored in the buffer 260 (at 330), the touch sensor 270 monitors contact with the ground electrodes 280. When contact is detected (at 340), the device 100 accesses the texture buffer (at 350) and plays the pattern (360) forming the message stored in the buffer 260. The pattern is then played at the actuated area 120 of the device 100 by way of the signal electrode 290.

When the method determines that the user is no longer contacting the ground electrodes 280 (at 370), the pattern stops and the buffer is updated 380. In some embodiments, the buffer is cleared to prepare for new notifications. In other embodiments, such as where messages stored in the buffer 260 may be output consecutively, it may remove the pattern played from the buffer and advance the next message to be output. In such cases, a user may release the device and grasp it again in order to output the next message. In other embodiments, all messages stored in the buffer are played consecutively, such as for 1-3 seconds each, upon detecting a touch from a user.

Accordingly, depending on the embodiment implemented, the method may return to its idle condition (at 330) or may be reset with a clear buffer. Regardless, the device 100 is typically provided with an indication that the message has been transmitted to the user.

In some embodiments, the message selected depends upon, or varies based on, a time at which the touch is detected (at 340). For example, the haptic device 100 may be used to inform a lecturer how much time remains in a presentation. In such an embodiment, the lecturer will contact the haptic device 100 at some point in the presentation, and the device will then retrieve the texture from the buffer but modify a variable parameter of the texture, such as speed or intensity, in order to indicate how much time is left in a countdown timer, or if time has expired. This is discussed in more detail below with respect to FIG. 9.

Alternatively, the intensity of a texture may be used to indicate how much time has elapsed since a message was received. For example, after a user misses a phone call, the texture may be mild after one minute, but may be more intense after an hour or more.

In some embodiments, the source of the message may be a third party and the device 100 may be used to relay messages directly to a user. For example, the device may be used by a nurse or a parent and may be used to relay messages related to a patient or child under their care. Alternatively, the device 100 may be paired with a separate autonomous system to provide a user with information.

In such embodiments, the user may configure the device to directly receive messages, and may allow the incoming message itself to define what texture will be presented. This is useful in situations where a user may require covert or subtle communication with another person. For example, a patient on the autism spectrum may use the device in this mode to receive live instruction from a facilitator, using rough or smooth haptic signals to help the user understand emotional affect of a visitor. The individual communication may be with a non-person entity, such as an algorithmic system designed to read the value of valence and arousal in a visitor's physical comportment, and then communicate this assessment to the user.

Because the device relays asynchronous information, several other modes of use are possible that are not available through synchronous means. One such application is for the continual monitoring of timeseries data: the device is updated regularly with the latest data in a series (for example: temperature inside a public space, number of outstanding support tickets, server load, stock prices, traffic route congestion, chance of rain in my location, etc), and is programmed to "play back" the last X samples in the timeseries in a loop. Such a device could be used by delivery personnel to understand when traffic conditions are optimal for route reassignment, or by analysts on a trading desk to stay abreast of a particular index's moment-to-moment performance. Examples of these methods are provided below in FIGS. 8-9.

Figure 7:
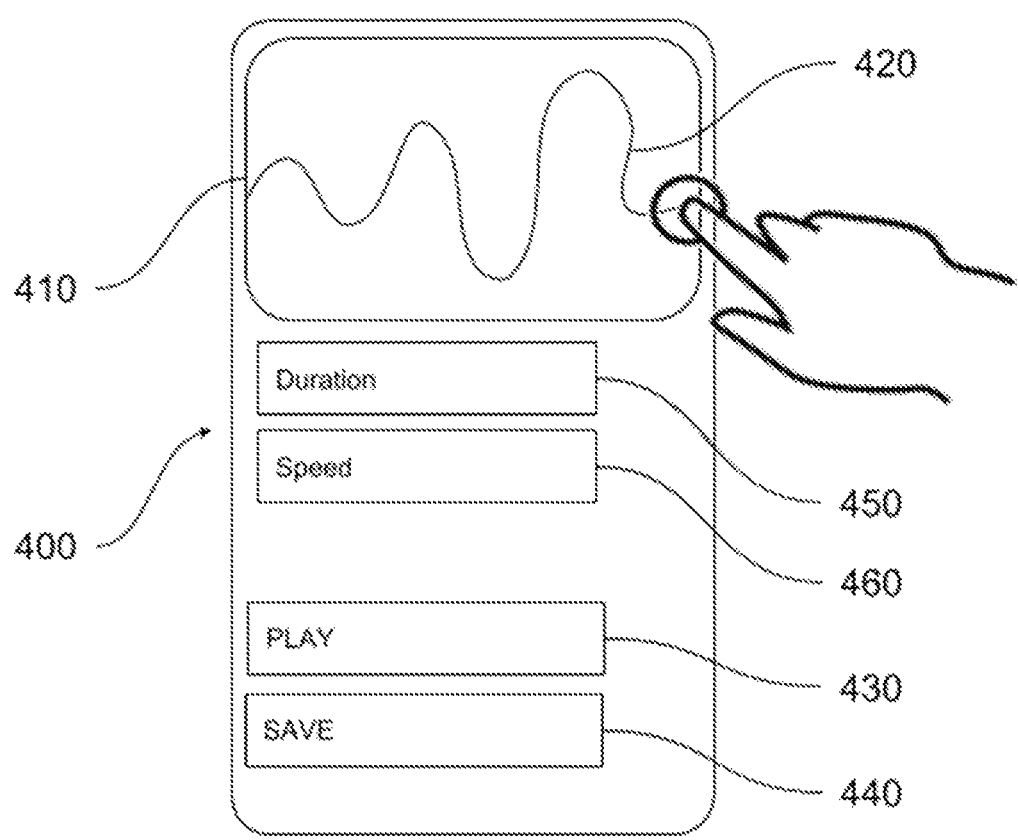
FIG. 7 shows a graphical user interface usable for composing messages for output by the communication device of FIG. 1.

FIG. 7 shows a graphical user interface (GUI) 400 usable for composing messages for output by the haptic device 100 of FIG. 1. As shown, the GUI provides a display area 410 on which a user can define a waveform 420. The user can either define such a waveform 420 using buttons in the GUI, such as in order to define characteristics, or the user can select a waveform from a dropdown menu. Alternatively, as shown, a user can define an arbitrary waveform 420 by drawing or tracing it in the display 410 directly. The user can then play 430 the waveform 420 selected or designed in order to test out how the defined texture would feel and, if acceptable, save it 440 for later use. Once the waveform 420, or multiple waveforms, is defined, it can be saved in the memory 230 and assigned to a specific type of message.

After creating an initial waveform 420 the user may adjust the duration 450 or speed 460 of the waveform and play 430 the resulting pattern. In this manner, users can test and save any number of waveforms. Further, once a waveform 420 is defined, a user may modify the speed 460 in order to feel the difference, and in some cases, define such speed, or some other parameter of the waveform, as a variable parameter that can indicate some secondary characteristic of a message. Accordingly, the waveform may indicate that a phone call or text message has been missed, while the speed can indicate how many such calls or messages have been missed.

While a simplified GUI is shown as an example of creating and saving a simple waveform 420, it is understood that a more sophisticated GUI may be provided in order to implement many of the methods provided herein. Accordingly, the GUI may allow for assigning specific waveforms 420 to specific alert types, for defining a sequencing of alerts, to define parameters that can vary, and many other tasks.

The definition of source messages to be transmitted to a user of the haptic device 100 may be complex and may be defined in the GUI. For example, if a user wants to be aware of missed messages from a specific party, such messages may be provided with a different texture and may be prioritized in delivery to the user.

Accordingly, in many of these examples, the user must determine the pattern or character of the electrovibration signal used in a particular context. The device 100 interface (on a remote screen, such as a mobile phone or personal computer) may feature the Graphical User Interface 400 shown in FIG. 7 that presents the user with a canvas on which he or she may draw an arbitrary waveform, which is then stored in memory 230 and/or sent to the texture buffer subsystem 260. The user may alter the timing and frequency of this repetition though the GUI. Additionally, the user may select from a library of pre-composed waveforms, combining them with each other through simple add, subtract, multiply, envelope-modulation, and convolution operations.

In this way, the device 100 provides the facility for the user to author specific signals through a composition interface presented onscreen—for example, drawing a specific waveform and then feeling that waveform played repeatedly through the peripheral device. This facility takes advantage of the human brain's ability to quickly learn new sensory inputs and discern between increasingly numerous, subtly differentiated signals. For example, users first experiencing an electrovibration actuator are often able to discern between 2 and 6 signals; over several weeks of use, the number of discernible signals expands significantly.

Figure 8:
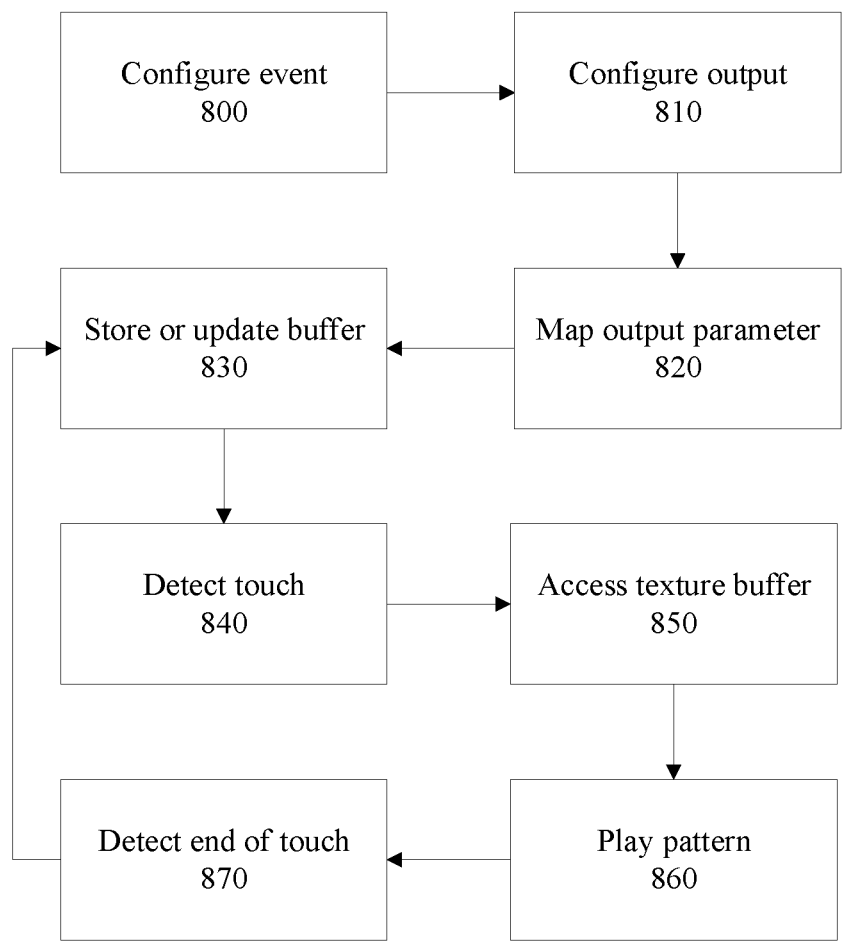
FIG. 8 is a flowchart illustrating a method for communicating a message to a user using the device of FIG. 1 to track a time interval of an event.

FIG. 8 is a flowchart illustrating a method for communicating a message to a user using the device of FIG. 1. In the method shown, the device is used to track a time interval of an event. As shown, a user typically would first define an interval or event (800) to be tracked. The user may then configure the output signal (810) used to represent the interval, such as by selecting a waveform, and map it to the interval (820).

In such a method, the user may choose to time an event, such as a spoken presentation (as discussed briefly above). Accordingly, the user would configure the output signal by, for example, selecting a triangular signal, and mapping a parameter to the interval. In such a way, the parameter, such as amplitude, frequency, or sharpness of the waveform, may be mapped to time remaining in the presentation. Alternatively, the user may simply set the device 100 to provide a defined texture once there are five minutes left in a meeting, allowing the user to covertly and discreetly feel, by touching the device, when he should begin wrapping up the meeting. As another example, the device 100 may be set to be activated at a certain time, such as 2 pm, with an interval of an hour, and over time the device's haptic output may become more "bumpy" or noticeable over that time.

In such an embodiment, the device 100 stores the notification in the buffer 260 (at 830) and constantly determines whether a user is contacting the ground electrodes 280. If no touch is detected, the device 100 continues to update the notification in the buffer by, for example, adjusting the parameter associated with the time remaining. If touch is detected (840), the device 100 accesses the texture buffer 260 (at 850) and plays the pattern in the buffer by outputting (860) the signal to the actuated area 120. When contact is no longer detected (870), the device 100 resumes updating the parameter of the message in the signal buffer.

In this way, a user may define a triangle as the output signal (at 810) and choose to represent the amount of time left in an interval as an increasingly "spiky" triangle wave, peaking at maximum amplitude at 1 minute before the interval expires.

Alternatively, the device 100 may cycle through disparate textures indicating a location within the time period. For example, the patterns could relate to time of day and may cycle through on a diurnal basis in order to impart in a user the "rhythms" of daylight throughout the seasons. In another example, the patterns could correspond to the state of the user's, or another person's fertility cycle. Another implementation could convey the time of day, or other natural phenomena, such as tidal patterns, in another part of the world, for example, where a remote spouse is located.

Figure 9:
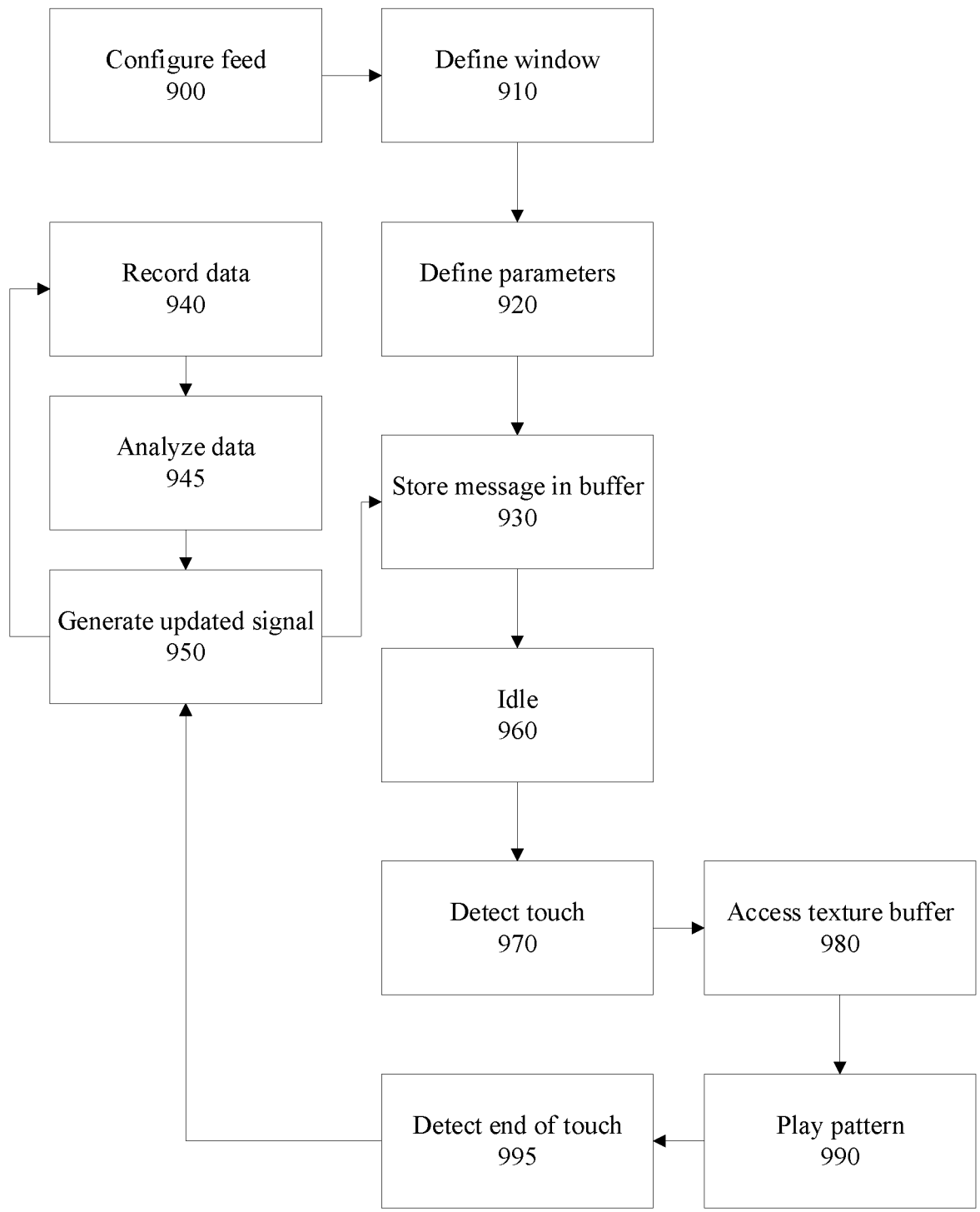
FIG. 9 is a flowchart illustrating a method for monitoring a live stream of time series data.

FIG. 9 is a flowchart illustrating a method for monitoring a live stream of time series data. For example, the data may be a stream of sensor data transmitted over a network. As shown, a user may first configure the timeseries feed (900) by selecting a data source to monitor. The data source may be selectable from a menu of available options. The user may then define a window to monitor (910) and configure the output signal, along with any variable parameters (920). In such a way, a user may choose to follow, for example, the stock market over different time intervals (i.e., over the last five minutes or since the market opened on a given day).

The user can, in this way, assign different characteristics of the time series data to different characteristics of a signal, such as frequency, amplitude, waveform, or any combination. The user can also set the upper and lower bounds of the data, and specify what the device should do after a touch event (i.e., should the buffer be cleared, or should everything be retained over the time interval).

The method then optionally provides an initial value for the variables and places an initial message in the buffer 260 (at 930) and records and monitors incoming timeseries data (at 940). As the data is received, the data is analyzed (945) according to the configuration definitions, and an updated signal is generated (at 950) and placed in the buffer 260 (at 930).

Once the message is placed in the buffer 260, the device 100 remains idle (960) until further action is detected, or until the buffer is updated further (at 950).

While the device 100 sits idle with messages stored in the buffer 260 (at 960), the touch sensor 270 monitors contact with the ground electrodes 280. When contact is detected (at 970), the device 100 accesses the texture buffer (at 980) and plays the pattern (990) forming the message stored in the buffer 260. The pattern is then played at the actuated area 120 of the device 100 by way of the signal electrode 290.

When the method determines that the user is no longer contacting the ground electrodes 280 (at 996), the pattern stops and the buffer continues to be updated as necessary (950).

In this way, the device 100 can be used to output a patter comprising a periodically-refreshed representation of the timeseries data which can be, for example, stock prices, probability of precipitation, visits to a website, or any other such data. Using this method, a user can easily track a volatile data source whenever desired by feeling the texture pattern on the device 100. In some embodiments, the mapping between the scalar range of the incoming data and the waveform or waveform pattern output by the haptic signal generator may not be linear. For example, the haptic signal could be an abstraction derived from the character timeseries data and can indicate that the data is, for example, highly volatile, increasing, decreasing, or stable, among other such abstractions. The parameters of the data that can be provided to the user can be defined in a user interface for the device.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A device for outputting haptic signals, the device comprising:
   processing circuitry for selecting a message to be output;
   a signal buffer for storing a message to be output;
   touch-detection circuitry;
   a haptic signal generator comprising a ground electrode and an actuated area; and
   a communication module for receiving an alert for transmission to a user, wherein the communication module is a wireless interface for linking the device to a mobile communications device;
   wherein the signal buffer outputs a stored signal to the actuated area as a haptic signal when the touch detection circuitry identifies contact with the ground electrode;
   wherein the actuated area is independent of the ground electrode, such that the touch-detection circuitry does not detect contact with the actuated area;
   wherein the same haptic signal is output to the entirety of the actuated area; and
   wherein the processing circuitry selects the message to be output based on parameters of the alert received.

2. A device for outputting haptic signals, the device comprising:
   processing circuitry for selecting a message to be output;
   a signal buffer for storing a message to be output;
   touch-detection circuitry; and
   a haptic signal generator comprising a ground electrode and an actuated area;
   wherein the signal buffer outputs a stored signal to the actuated area as a haptic signal when the touch detection circuitry identifies contact with the ground electrode;
   wherein the actuated area is independent of the ground electrode, such that the touch-detection circuitry does not detect contact with the actuated area;
   wherein the same haptic signal is output to the entirety of the actuated area;
   wherein the message to be output is one of several patterns to be output as a haptic signal; and
   wherein a plurality of messages are selected for output in sequence, each message comprising a distinct pattern.

3. A device for outputting haptic signals, the device comprising:
   processing circuitry for selecting a message to be output;
   a signal buffer for storing a message to be output;
   touch-detection circuitry; and
   a haptic signal generator comprising a ground electrode and an actuated area;
   wherein the signal buffer outputs a stored signal to the actuated area as a haptic signal when the touch detection circuitry identifies contact with the ground electrode;
   wherein the actuated area is independent of the ground electrode, such that the touch-detection circuitry does not detect contact with the actuated area;
   wherein the same haptic signal is output to the entirety of the actuated area; and
   wherein a message to be output is a pattern having a parameter that can be adjusted based on a parameter of a source message received at the processing circuitry.

4. The device of claim 3, wherein the parameter varies over time and wherein the parameter of the message output to the actuated area depends on the time at which the touch detection circuitry identifies contact with the ground electrode.

5. The device of claim 4, wherein the message represents time remaining on a timer, and wherein the parameter represents an amount of time remaining.

6. The device of claim 3 wherein the parameter represents volatility of time series data.

7. The device of claim 1 wherein the actuated area remains stationary while outputting the haptic signal.

8. The device of claim 7 wherein the signal is retrieved from the actuated area by rubbing the actuated area.

9. The device of claim 7 wherein the signal detected is an electrical difference between a charge on the actuated area and a charge on the ground electrode, the ground electrode being used to remove charge imparted by the signal electrode from the system.

10. A device for outputting haptic signals, the device comprising:
processing circuitry for selecting a message to be output;
a signal buffer for storing a message to be output;
touch-detection circuitry;
a haptic signal generator comprising a ground electrode and an actuated area; and
a second ground electrode,
wherein the signal buffer outputs a stored signal to the actuated area as a haptic signal when the touch detection circuitry identifies contact with the ground electrode;
wherein the actuated area is independent of the ground electrode, such that the touch-detection circuitry does not detect contact with the actuated area;
wherein the same haptic signal is output to the entirety of the actuated area; and
wherein the touch-detection circuitry outputs the haptic signal only when contact with both ground electrodes is detected.

11. The device of claim 1, wherein the device comprises a housing or a case for a mobile device, and wherein the ground electrode is located on a side surface of the housing or case and wherein the actuated area is located on a back surface of the housing or case.

12. A device for outputting haptic signals, the device comprising:
processing circuitry for selecting a message to be output;
a signal buffer for storing a message to be output;
touch-detection circuitry;
a haptic signal generator comprising a ground electrode and an actuated area; and
wherein the signal buffer outputs a stored signal to the actuated area as a haptic signal when the touch detection circuitry identifies contact with the ground electrode;
wherein the actuated area is independent of the ground electrode, such that the touch-detection circuitry does not detect contact with the actuated area;
wherein the same haptic signal is output to the entirety of the actuated area; and
wherein the actuated area does not have an associated visual display.

13. A method for outputting haptic messages to a user, the method comprising:
selecting, at processing circuitry, a message to be output to a user;
storing the message in a signal buffer;
detecting contact at a ground electrode of a haptic signal generator;
outputting the message to an actuated area of the haptic signal generator independent of the ground electrode upon detecting contact at the ground electrode;
wherein the message is a pattern output at the actuated area as a haptic signal in the form of an electrical difference between a voltage at the ground electrode and a voltage at the actuated area;
wherein the same haptic signal is output to the entirety of the actuated area; and
wherein the message is one of a plurality of messages to be output in sequence, each message comprising a distinct pattern.

14. The method of claim 13 wherein the actuated area remains stationary while outputting the haptic signal, and further comprising a user rubbing the actuated area to detect the haptic signal.

15. A method for outputting haptic messages to a user, the method comprising:
selecting, at processing circuitry, a message to be output to a user;
storing the message in a signal buffer;
detecting contact at a ground electrode of a haptic signal generator;
outputting the message to an actuated area of the haptic signal generator independent of the ground electrode upon detecting contact at the ground electrode;
wherein the message is a pattern output at the actuated area as a haptic signal in the form of an electrical difference between a voltage at the ground electrode and a voltage at the actuated area;
wherein the same haptic signal is output to the entirety of the actuated area; and
wherein the message to be output is a pattern having a parameter that can be adjusted based on a parameter of a source message received at the processing circuitry, and wherein the parameter varies over time, and wherein the message output to the actuated area depends on a time at which contact is detected at the ground electrode.

16. A method for outputting haptic messages to a user, the method comprising:
selecting, at processing circuitry, a message to be output to a user;
storing the message in a signal buffer;
detecting contact at a ground electrode of a haptic signal generator;
outputting the message to an actuated area of the haptic signal generator independent of the ground electrode upon detecting contact at the ground electrode;
wherein the message is a pattern output at the actuated area as a haptic signal in the form of an electrical difference between a voltage at the ground electrode and a voltage at the actuated area;
wherein the same haptic signal is output to the entirety of the actuated area; and
wherein the message represents time remaining on a timer, and wherein parameter represents an amount of time remaining.

* * * * *